Oct. 29, 1963    R. V. CHESNEY    3,108,702
HAND CART FOR TRANSPORTING TRASH CANS
Filed Sept. 15, 1960

INVENTOR.
RAYMOND V. CHESNEY
BY
Des Jardins, Robinson, Little & Schenk

United States Patent Office 3,108,702
Patented Oct. 29, 1963

3,108,702
HAND CART FOR TRANSPORTING TRASH CANS
Raymond V. Chesney, R.R. 1, Mason, Ohio
Filed Sept. 15, 1960, Ser. No. 56,181
6 Claims. (Cl. 214—375)

This invention relates generally to hand carts or trucks and more particularly to hand carts or trucks for handling trash cans and the like having lifting handles secured thereto.

An object of the present invention is to provide an improved hand cart whereby a heavy can may be moved from place to place with a minimum of physical exertion by the operator of the cart.

Another object of the present invention is to provide a cart which can lift a can from a rest position on the ground to a position wherein the can be suspended on the cart for movement from one location to another.

Still another object of the present invention is to provide a hand cart whereby one person, unassisted, can lift a can onto the cart by means of moving the cart up to a can, connecting the cart to the can and then tilting the cart to a desired position, such tilting action being effective in raising the can into a position where it is suspended upon the cart for transportation from one location to another with comparative ease.

Still another object of the present invention is to provide a hand cart capable of transporting heavy and cumbersome cans up and down staircases with a minimum of effort.

Another object of the present invention is to provide a hand cart for transporting trash cans and the like whereby the can is sustained in a desired position on the body of the cart so that the greater portion of the weight of the can is distributed directly to the wheels of the cart for ease of the transportation.

Another object of the present invention is to provide a hand cart adapted to handle cans of varying size and shape and one which is constructed of light weight materials but sufficiently strong to support a fully loaded can and further a cart of such size as to be readily stored when not in use.

Another object of the present invention is to provide a hand cart for transporting trash cans and the like, characterized by its structural simplicity, the ease of the assembly of its parts, its strong and sturdy nature and its low manufacturing cost. Other features of this invention reside in the arrangement and design of the parts for carrying out their appropriate function.

Further objects of the present invention and certain practical advantages will be referred to in or will be evident from the following description of one embodiment of the invention as illustrated in the accompanying drawings, in which.

Before describing in detail the herein disclosed embodiment of the invention, it is to be understood that the present invention is not limited to the structural details or the particular arrangement of parts herein shown, as devices embodying the present invention may take other forms. It also is to be understood that the phraseology and terminology herein used are for purposes of description and not of limitation, as the scope of the present invention is denoted by the appended claims.

The device comprises generally a frame 10, axle 12, wheels 14 and a spacer 16 for maintaining the proper alignment and spacing of the frame and wheels.

Figure 2:
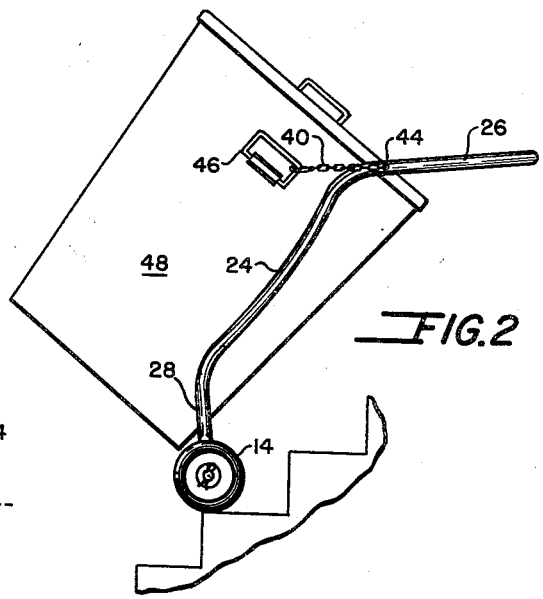
FIGURE 2 is a side elevational view of the device with a can supported thereon and showing the manner in which the device negotiates stairs.
Figure 3:
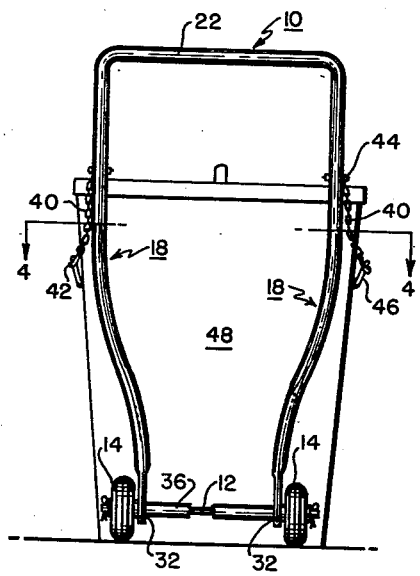
FIGURE 3 is a rear elevational view of the device.
Figure 4:
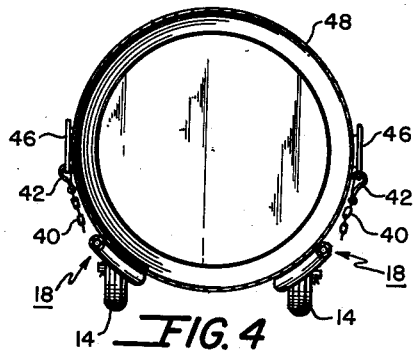
FIGURE 4 is a transverse sectional view taken along the plane of line 4—4 of FIGURE 3
Figure 5:
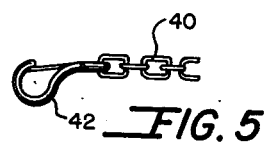
FIGURE 5 is an enlarged fragmentary view of the chain and hook used in combination with the present invention.

The frame 10 is preferably constructed of any suitable metal tubing such as aluminum, galvanized steel or other material which requires little or no upkeep. The frame is made of a single bent tube, rod, or bar and includes a substantially inverted U-shaped frame, as seen in FIGURE 3, having identical spaced arms 18 and a closed upper end 22 which forms a handle. As seen in the side view of FIGURES 1 and 2 the legs of the U-frame comprise three main portions; namely, that of a central portion 24, an upper handle portion 26 which extends upward and backward from the central portion 24, and a lower portion which extends downward and backward from the central portion 24. The legs 18 are bent between the central portion 24 and the upper portions 24 and 26 as at 30. The angle between portions 24 and 26 preferably falls within the range of 90° to 145°. The legs 18 as seen in FIGURE 3 converge downwardly so their lower ends are closer together than the upper ends thereof. The lower ends 28 of the legs 18 are bent downwardly and inwardly from the central portion 24 at 32 and form, obtuse angle preferably falling within a range of from about 100° to 160°. While the legs 18 converge downwardly, they also are provided with a suitable concavity as seen in the side view of FIGURE 1. This permits the side legs to conform more readily to the outer surface of a plurality of different size cans and provides more line contact between the legs 18 and the can. Thus providing greater support for the can as it is suspended on the cart. This construction also facilitates handling cans which are out of round and cans of various heights and sizes.

The lower free ends of the side legs are preferably flattened as shown at 32 in FIGURE 3 to lend rigidity and are provided with apertures adapted to receive the axle 12. The axle 12 is provided with spaced wheels 14 which preferably contain rubber tires.

It has been found that wheels of six inch (6") diameter or greater cost substantially more than those of lesser diameter. With the present construction, a wheel as small as one inch (1") may be used; however, a wheel having a diameter of 3" to 5" is preferred particularly for use over rough surfaces, such as, gravel driveways and steps having horizontal overhanging portions.

Preferably but not necessarily means are provided for maintaining the transverse spacing between the lower spaced free ends of the side legs 18. Such spacing means may take the form of a tubular member 36 as seen in FIGURE 3 which is adapted to slide over the axle 12 and preferably has a bore having an inner-diameter just slightly greater than the outer-diameter of the axle 12. Of course, it will be understood that other means for maintaining the spacing of the transverse numbers may be employed such as suitable washers (not shown) secured to the axle and spaced on either side of the bar members, or suitable braces between the legs; however, it has been found that the tubular member 36 not only serves as a spacing means; but also, lends rigidity and strength to the axle and helps to prevent the axle from bending when subjected to severe loads.

Through the provision of rearwardly and downwardly extending lower portions 28 the wheels 14 are offset to the rear of the central portion 24 of the frame and facilitate the loading of the can upon the cart as hereinafter described. The preferred offset distance is one which places the axle of the wheel in a plane parallel to central portion 24 and spaced therefrom in accordance with the size of the wheel used.

Each of the side legs is provided with a chain 40 having a hook 42 provided at the end thereof. The chains are suitably secured to the legs by means of metal screws 44 or by a suitable clamp (not shown) which frictionally engages the leg or in any other suitable manner. Preferably the chain 40 is secured to the bar in the region of bend 30. A chain approximately 4" to 6" in length has proven to be suitable.

Figure 1:
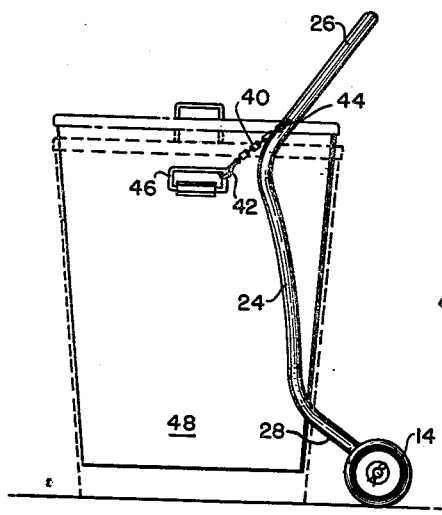
FIGURE 1 is a side elevational view of the device engaged with a can and in an intermediate stage of lifting the can from the ground.

As seen in FIGURE 1 when the cart is tilted forward so that the hooks 42 may be engaged with the handle 46 of the can 48 the upper end of the chain 40 is preferably approximately 4" above the level of the handle. For example, the average handle of trash can is located 16" above the bottom of the can, thus in the position as seen in FIGURE 1 the upper end of each chain may be secured to its respective bar at an elevation which would be approximately 20" above the ground. The chains are preferably long enough so that the angle between the chain and the legs 18 in an engaging position with the handle of the can as seen in FIGURE 2 does not substantially exceed 45°. However, the chain should not be so long as to permit the bottom of the can to drag on the ground when the cart is held in the operative position of FIGURE 2.

When using my cart to transport trash cans, it is first wheeled up to a can which presumably is resting on the ground. The cart is tilted in a forward direction, as seen in FIGURE 1 toward the can with the wheels spaced rearwardly of the can to permit engagement of the hooks 42 at the end of the chains 40 with the handles 46 of the can 48. Upon engagement of the hooks with the handles of the can the operator places downwardly pressure upon the handle portion 22 of the frame of the cart to tilt the cart rearwardly and downwardly about the wheels 14 to the position illustrated in FIGURE 2 By so doing the can is raised from the floor into a suspended position wherein it is cradled by said side legs 18 in the carriage position as seen in FIGURE 2. As seen in FIGURE 2, the can is actually cradled within the converging side bars 18 and is raised sufficiently above the ground level, as not to interfere with the movement of the cart during transportation of the can.

With the offset construction of the wheels, the center of the weight is directly above the wheels and thus distributed directly to the wheels with a minimum of effort required in transporting a substantial load. In other words, the main load component of the can in a carriage position, as seen in FIGURE 2, is directly upon the wheels. It is only necessary for the operator to balance the cart in the position shown in FIGURE 2 so that the load remains in the preferred position and above the wheels 14. Furthermore, by locating the wheels in an offset manner the can is carried forwardly of the wheels which permits the cart to be readily moved up and down stairs as seen in FIGURE 2. Thus it will be seen that I have prepared a cart which will be extremely inexpensive to construct since it includes only five major pieces; namely, a U-shaped frame, an axle, a spacer bar and two wheels; and in addition, a pair of chains. The cart can be easily constructed by simply cutting a piece of tubing to the required length, bending it into a U-shape at one end, drilling holes in the free ends, and assembling the wheels to the axle. Riveting, bolting and welding are completely eliminated and there is no need for expensive tools for constructing and assembling the device.

In view of the foregoing description, taken in conjunction with the accompanying drawings, it is believed that a clear understanding of the construction, operation, and advantages of the device will be quite apparent to those skilled in this art.

Having thus described my invention and illustrated its use, what I claim is new and desire to secure by Letters Patent is:

1. A lightweight hand cart comprising a generally U-shaped tubular frame, said U-shaped tubular frame providing a pair of spaced downwardly converging legs, said legs comprising a center portion adapted to support an object to be carried, an upper portion which extends rearwardly and upwardly from said central portion at an angle to said central portion and forming a handle portion at the closed end of said frame, and a lower portion which extends downwardly and rearwardly from said central portion at an angle to the central portion, said central portion of said legs being curved rearwardly to more closely conform to the outer surface of an object to be carried and to provide greater line contact with said object, an axle secured to said lower portion of said frame, a pair of wheels mounted on said axle and flexible hook means secured to said leg for engaging an object to be carried and retaining said object on said frame for transportation thereon.

2. The combination of claim 1 wherein spacing means are provided adjacent the lower portion of said legs maintaining the desired spacing between said lower portions of said legs.

3. The combination of claim 1 wherein said flexible hook means comprise a chain having a hook secured to the free end thereof, said chain connected to said U-shaped frame.

4. A lightweight hand cart for lifting cans having a tabular frame member comprising two spaced downwardly converging legs, each leg having an upwardly and rearwardly extending handle portion, each of said legs having a lower portion extending downwardly and rearwardly, wheels secured to said lower portions of said legs, each of said legs having a central portion between said handle and lower portion, said central portion of each leg being curved in the direction of at least two different planes, and flexible engaging means secured to each of said legs and adapted to engage the handles of the can for the purpose of retaining said can on said frame in a position wherein said can is carried between and supported upon said spaced converging legs.

5. The combination of claim 4 wherein said flexible engaging means comprise a chain and hook, secured to each of said legs at a level above the level of the handle of said can in a can engaging position of said cart.

6. A lightweight hand cart for lifting cans having a tubular frame member comprising two spaced downwardly converging legs, each leg having an upwardly and rearwardly extending handle portion, each of said legs having a lower portion extending downwardly and rearwardly, wheels secured to said lower portions of said legs, and flexible engaging means secured to each of said legs and adapted to engage the handles of the can for the purpose of retaining said can on said frame in a position wherein said can is carried between and supported upon said spaced converging legs, said spaced downwardly converging legs being curved to more readily conform to the outer surface of said can supported thereon to provide more lineal contact between said legs and said can and thereby lend additional support to said can during transportation on said cart.

References Cited in the file of this patent

UNITED STATES PATENTS

| | | |
|---|---|---|
| 227,790 | Johnson | May 18, 1880 |
| 344,684 | Sherer | June 29, 1886 |
| 781,003 | Holmes | Jan. 31, 1905 |
| 1,158,235 | Kinnard | Oct. 26, 1915 |
| 1,870,163 | Behling | Aug. 2, 1932 |
| 2,476,539 | Fortin | July 19, 1949 |
| 2,477,294 | Fuller | July 26, 1949 |